Jan. 18, 1966   G. BUDDENHAGEN   3,230,117
PROCESS AND APPARATUS FOR FLAME SCARFING
Filed Aug. 8, 1961   2 Sheets-Sheet 1
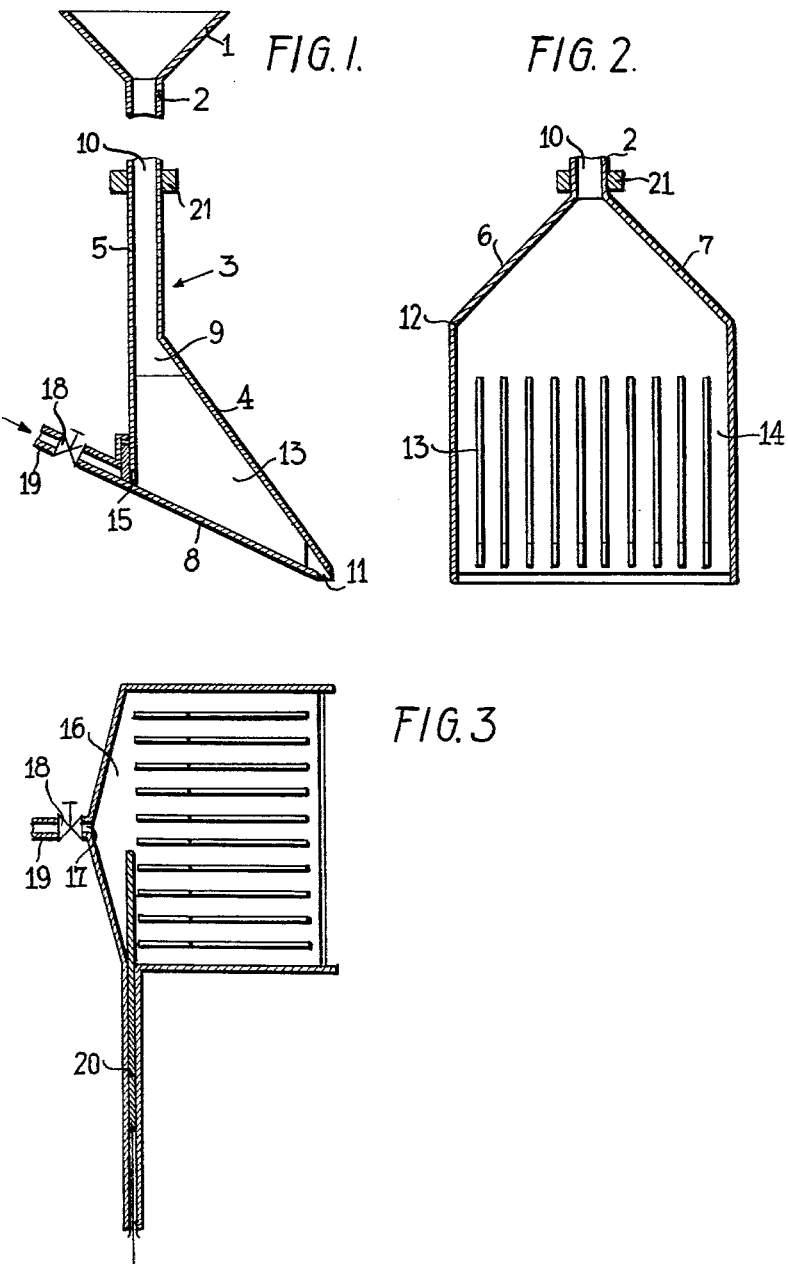
INVENTOR
GÜNTER BUDDENHAGEN
BY Connolly and Hutz
his ATTORNEYS Jan. 18, 1966 G. BUDDENHAGEN 3,230,117
PROCESS AND APPARATUS FOR FLAME SCARFING
Filed Aug. 8, 1961 2 Sheets-Sheet 2

INVENTOR
GÜNTER BUDDENHAGEN
BY Connolly and Hutz
his ATTORNEYS

United States Patent Office 3,230,117
Patented Jan. 18, 1966

3,230,117
PROCESS AND APPARATUS FOR FLAME SCARFING
Günter Buddenhagen, Frankfurt am Main, Germany, assignor, by mesne assignments, to Messer Griesheim G.m.b.H., Frankfurt am Main, Germany, a corporation of Germany
Filed Aug. 8, 1961, Ser. No. 130,131
Claims priority, application Germany, Aug. 12, 1960, K 41,449
7 Claims. (Cl. 148—9.5)

The present invention relates to a process and an apparatus for the flame scarfing of ingots with an auxiliary agent, advantageously iron powder.

It is known to flame scarf ingots with the help of so-called scarfing heads which are provided with oxygen nozzles which direct a substantially uniform flat oxygen stream at an angle against the surface of the ingot to be flame-scarfed, and with powder nozzles which distribute the powder uniformly in the stream of cutting oxygen after the latter has left the oxygen nozzle. In the known scarfing heads, the powder is introduced into the stream of cutting oxygen with the help of a carrier gas. The powder is stored in a hopper from which it is drawn off by the injector action of a gas stream, generally a compressed air jet, and blown with the gas out off the powder nozzle into the stream of cutting oxygen.

The aforesaid process is beset with a number of disadvantages. For conveying the powder, a gas pressure of about 4 atmospheres gage is generally necessary. The walls of the feed pipes and of the powder nozzle must therefore be of an appropriate thickness. To avoid clogging, the powder has to be conveyed at a high speed through the feed pipes which are generally designed as hoses. This involves a great wear of hoses, hose connections, valves and of the powder nozzle. Moreover, certain conditions have to be observed with regard to the conveying gas, especially as to the moisture content. The use of a conveying gas furthermore has the disadvantage that the powder mixtures separate readily and that the powder content must not exceed a determined maximum value.

Now I have found that the aforesaid disadvantages can be avoided by conveying the powder exclusively by its own weight to a position close to the powder nozzle exit and then conveying it through the powder nozzle exit into a stream of cutting oxygen with the help of a pressure medium, advantageously compressed air. With this arrangement, it is not necessary to design the storage container as a hopper. The walls of the hose pipes and powder nozzle may be thin. No friction occurs so that the powder nozzle and the feed pipes are not used up within a short time and any desired types of powder or mixture may be used.

The present invention also provides a powder nozzle for carrying out the process of the invention. In accordance with the invention, the nozzle comprises an about vertical arrangement of at least one nozzle channel. It also comprises at least one device disposed near the nozzle exit for blowing the powder out off the powder nozzle into the stream of cutting oxygen. According to a further conception of the invention, the powder nozzle is provided with means for distributing the powder in the nozzle channel uniformly over the width of the powder nozzle exit.

An apparatus suitable for use in carrying out the process of the invention is illustrated diagrammatically by way of example in the accompanying drawings.

Referring to the drawings,

FIG. 1 is a side section of a powder nozzle designed as a flat nozzle,

FIG. 2 is a front section of the same powder nozzle with the front wall removed, FIG. 3 is a top section of the device of FIGS. 1 and 2, FIGS. 4 and 5 are side sections of further constructional forms of the apparatus of the invention.

Figure 4:
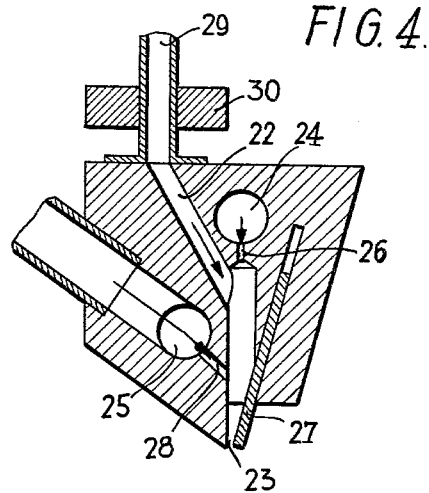

The apparatus shown in FIGS. 1 and 2 comprises a storage container 1 from which the powder flows through a feed pipe 2 to powder nozzle 3. The latter consists of a front wall 4, a back wall 5, side walls 6 and 7 and a bottom plate 8, which form a nozzle channel 9. In the upper part of channel 9, front wall 4 and back wall 5 are parallel to one another. In the lower part of channel 9, front wall 4 draws away from back wall 5. The bottom plate 8 rises from the powder nozzle exit 11 in a slanting direction; it may, however, also be horizontally arranged. Side walls 6 and 7 are directed outward in a slanting direction from powder inlet 10 so that the channel 9 is enlarged to form a rectangular powder nozzle exit 11 extending at least over the whole width of the stream of cutting oxygen. In FIGS. 1 and 2, the channel has the same width as the powder nozzle exit already at 12. Alternatively, side walls 6 and 7 may be directed in a manner such that the width of the powder nozzle exit is attained only immediately at the powder nozzle exit 11.

At back wall 5, a device for blowing the powder out off powder nozzle exit 11 into the stream of cutting oxygen is disposed at about the height of the bottom plate 8 (for the device itself see also FIG. 3). This device consists of a slot 15 which extends over the whole width of back wall 5. To slot 15 a flat space 16 of the same width is attached which tapers towards the side opposite slot 15 to form an inlet opening 17 to which a valve 18 is attached. The latter is connected to a pipe 19 for compressed air.

In that part of channel 9 which has the same width as the powder nozzle exit 11, partition walls 13 are disposed which subdivide channel 9 into several chambers 14. The latter extend to back wall 5 and serve to distribute the powder uniformly over the whole width of powder nozzle exit 11. Chambers 14, in combination with a valve 20 attached to slot 15, also enable the powder nozzle exit 11 to be adjusted to an effective width. The valve 20 may have a desired cross-sectional area and is advantageously circular. Instead of one valve, several individual valves may be disposed each of which is attached to one or several chambers. The valve 20 is advantageously connected in parallel with means for adjusting the width of exit of the stream of cutting oxygen and heating gas, which adjusting means are disposed at the scarfing head, so that the widths of the powder stream and the oxygen stream are adjusted to one another.

To interrupt the powder stream, a stop valve 21 which is advantageously designed as a solenoid valve is disposed in feed pipe 2. When the bottom plate 8 is arranged substantially horizontally, it is also possible to interrupt the powder stream by shutting the valve 18 or the valve 20.

The powder nozzle of the present invention operates as follows:

After the solenoid valve 21 has been opened, powder falls from storage container 1 through feedpipe 2 into channel 9 and fills the latter, particularly chambers 14. Since the dead weight of the powder enables only a small amount of powder to fall through powder nozzle exit 11, chambers 14 are filled within a short time. Then valve 18 is opened and the powder lying on the bottom plate 8 is blown by a compressed air jet through powder nozzle exit 11 into the stream of cutting oxygen. New powder falls down from above and a continuous blowing out is assured. The amount of powder that issues can be controlled by regulating the air pressure with the help of valve 18.

FIG. 4 shows another constructional form of the apparatus of the invention. Instead of a single channel extending over the whole width of the powder nozzle exit 23, several channels 22 are arranged one beside the other. Channels 22 are also substantially vertical. Compressed air pipes 24 and 25 are connected thereto before powder nozzle exit 23.

With this form of construction, the powder falls, owing to its dead weight, from a storage container (not shown) through feed pipe 29 and channels 22 to a position immediately before powder nozzle exit 23. It is then blown out off the powder nozzle at an increased speed by compressed air issuing from slot 26. To obtain a smooth flat stream of powder issuing from the powder nozzle and not individual streams of powder with this form of construction in which several channels 22 are arranged one beside the other, the powder is hurled against a known baffle plate 27 before leaving the powder nozzle, whereby the powder is uniformly distributed over the width of the powder nozzle exit and the powder stream is simultaneously deflected vertically.

Immediately before the outlet of channels 22 but, with reference to the direction of motion of the powder, after the position at which the compressed air jet issuing from slot 26 strikes the powder, a slot 28 is disposed which is attached to compressed air pipe 25 and through which compressed air flows into channels 22 under variable pressure. By varying the pressure of the additional air issuing from slot 28, the amount of powder that issues from the powder nozzle can be regulated within wide limits. When the pressure of the additional air is equal to, or higher than, that of the conveying air, the transport of powder is interrupted. In this manner, the amount of powder that issues can be adjusted by counter-pressure in an infinitely variable manner to a value ranging from zero to a maximum that is determined by the diameter of channels 22.

To stop the powder stream completely, a solenoid valve 30 is disposed in the feed pipe 29. After the solenoid valve 30 has been closed, it is possible to maintain the stream of conveying air and thus to purify the powder nozzle exit 23 and the outlets of channels 22. The complete or partial interruption of the powder stream can be brought about by means of a valve, advantageously a piston valve, attached to compressed air pipe 25.

Figure 5:
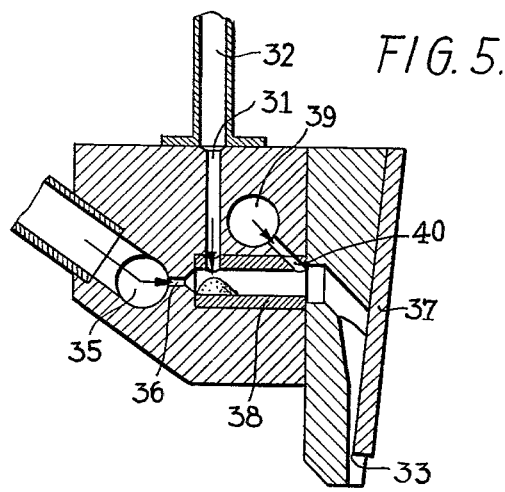

In the mode of construction shown in FIG. 5, several channels 31 are vertically arranged one beside the other. Owing to its dead weight, the powder falls from a storage container (not shown) through the feed pipe 32 and channels 31 down to a position near the powder nozzle exit 33. Contrary to FIG. 4, the speed of the powder falling down is not accelerated in the direction of fall by an air jet acting on the powder but, similar to FIG. 1, the direction of motion of the powder is deflected by an air jet issuing from slot 36, attached to compressed air pipe 35, and the powder is hurled against a baffle plate 37. The insertion of a horizontal intermediate piece 38 in channel 31 enables a stop valve in feed pipe 32 to be dispensed with.

To regulate the amount of powder that issues, a regulating device 39, 40 which is similar to that shown in FIG. 4, is disposed after the conveying device 35, 36 in the horizontal part 38 of channel 31.

The apparatus of the invention is especially suitable for use in feeding powder to flame scarfing processes but it is not limited thereto.

I claim:

1. In combination therewith a process for flame scarfing ingots with an auxiliary powder which is blown through powder nozzles into a stream of oxidizing gas by conveying the powder from a powder supply to the powder nozzles through at least one powder channel, the improvement comprising conveying the powder exclusively by gravity fall from said powder supply through a free-fall channel and into a pressure channel, introducing a pressure medium into the pressure channel at the junction of the free-fall channel and the pressure channel to blow the powder through the nozzles into the stream of oxidizing gas, and said powder being blown through said pressure channel a distance substantially less than its distance of free-fall.

2. An apparatus for flame scarfing a metal body comprising means for applying preheat to a surface portion of such body, means for discharging a relatively flat stream of oxidizing gas at an acute angle against such heated portion, powder supply means attached to the discharging means for projecting a stream of powder laden gas at an acute angle against the stream of oxidizing gas, a generally vertical free-fall channel connected to said powder supply means, a pressure channel communicating with said free-fall channel whereby the powder may fall from said supply means into said pressure channel, said pressure channel being substantially shorter than said free-fall channel, nozzle means at the discharge end of said pressure channel, and pressure medium means at the junction of said free-fall channel and said pressure channel for accelerating the flow of powder through said nozzle means.

3. An apparatus as set forth in claim 2 wherein said pressure channel is in a generally vertical orientation, and said pressure medium means being disposed in the same general direction as the path of flow of powder through said pressure channel.

4. An apparatus for flame scarfing a metal body comprising means for applying preheat to a surface portion of such body, means for discharging a relatively flat stream of oxidizing gas at an acute angle against such heated portion, powder supply means attached to the discharging means for projecting a stream of powder laden gas at an acute angle against the stream of oxidizing gas, a generally vertical free-fall channel connected to said powder supply means, a pressure channel communicating with said free-fall channel whereby the powder may fall from said supply means into said pressure channel, said pressure channel being substantially shorter than said free-fall channel, nozzle means at the discharge end of said pressure channel, pressure medium means at the junction of said free-fall channel and said pressure channel for accelerating the flow of powder through said nozzle means, and a secondary pressure medium means communicating with said pressure channel downstream from the first pressure medium means.

5. An apparatus as set forth in claim 4 wherein both of said pressure medium means are disposed in the same general direction as the path of flow of the powder through said pressure channel, and said pressure channel being in a generally vertical orientation.

6. An apparatus as set forth in claim 5 wherein said first pressure medium means is substantially in line with said pressure channel, and said secondary pressure medium means being at an angle with respect to said pressure channel.

7. An apparatus as set forth in claim 5 wherein a portion of said pressure channel between said first and said secondary pressure medium means is horizontal with respect to said free-fall channel for interrupting the flow of powder from said nozzle means when said first pressure medium means is inactive.

References Cited by the Examiner

UNITED STATES PATENTS

| | | | |
|---|---|---|---|
| 213,789 | 4/1879 | Motay et al. | 148—9 |
| 968,350 | 8/1910 | Harrison | 148—9 |
| 1,412,656 | 4/1922 | Jenkins | 148—9 |
| 1,518,223 | 12/1924 | Schott et al. | 302—63 |

(Other references on following page)

| | | UNITED STATES PATENTS | |
|---|---|---|---|
| 1,898,385 | 2/1933 | Morton | 302—62 |
| 2,429,326 | 10/1947 | Miller et al. | 266—23 |
| 2,470,999 | 5/1949 | Meincke | 148—9.5 |
| 2,654,329 | 10/1953 | Fleming | 148—9 |
| 2,794,755 | 6/1957 | Moesingse | 148—9.5 |
| 2,873,224 | 2/1959 | Thompson et al. | 148—9 |

| | | FOREIGN PATENTS | |
|---|---|---|---|
| 126,697 | 1/1948 | Australia. | |
| 371,943 | 10/1920 | Germany. | |

DAVID L. RECK, *Primary Examiner.*

RAY K. WINDHAM, *Examiner.*